United States Patent [19]

Ogasawara et al.

[11] Patent Number: 5,097,115

[45] Date of Patent: Mar. 17, 1992

[54] TRANSACTION AUTHENTICATION SYSTEM

[75] Inventors: Nobuo Ogasawara, Koganei; Yoshiyuki Ozaki, Yokohama, both of Japan

[73] Assignee: Fujitsu Limited, Kawasaki, Japan

[21] Appl. No.: 413,748

[22] Filed: Sep. 28, 1989

[30] Foreign Application Priority Data

Oct. 3, 1988 [JP] Japan .................. 63-249561

[51] Int. Cl.$^5$ .............................. G06V 5/00
[52] U.S. Cl. .................. 235/380; 235/379; 235/381
[58] Field of Search ............ 235/379, 380, 492; 902/2; 380/24

[56] References Cited

U.S. PATENT DOCUMENTS

| | | | |
|---|---|---|---|
| 4,453,074 | 6/1984 | Weinstein | 235/380 X |
| 4,473,825 | 2/1985 | Walton | 235/380 X |
| 4,906,828 | 3/1990 | Halpern | 235/492 |

FOREIGN PATENT DOCUMENTS

| | | |
|---|---|---|
| 0220703 | 8/1983 | European Pat. Off. |
| 0086286 | 7/1985 | European Pat. Off. |
| 0198384 | 10/1986 | European Pat. Off. |
| 0234954 | 9/1987 | European Pat. Off. |
| 0281058 | 9/1988 | European Pat. Off. |

144967 of 1983 Japan .
WO85/03787 8/1985 PCT Int'l Appl. .

*Primary Examiner*—Harold Pitts
*Attorney, Agent, or Firm*—Staas & Halsey

[57] ABSTRACT

A transaction authentication system comprises a terminal, a first memory and an IC card which is detachably loaded into the terminal. The terminal supplies at least transaction data which is related to a transaction a designated storage region in a second memory stores the transaction data to the IC card when the IC card accesses to a service via the terminal. A second processor of the IC card writes the transaction data received from the terminal in the designated storage region of the second memory and generates a vertified data which is renewed every time the transaction data is written into the second memory. The verified data has a value in conformance with a predetermined generating algorithm and is stored in the second memory and also supplied to the terminal. A first processor of the terminal generates transaction historical information which includes at least the designated storage region, the transaction data and the vertified data and stores the transaction historical information in the first memory. Thus a transaction is authenticated from a corresponding of the verified data stored in the first memory and the verified data stored in the second memory.

18 Claims, 9 Drawing Sheets

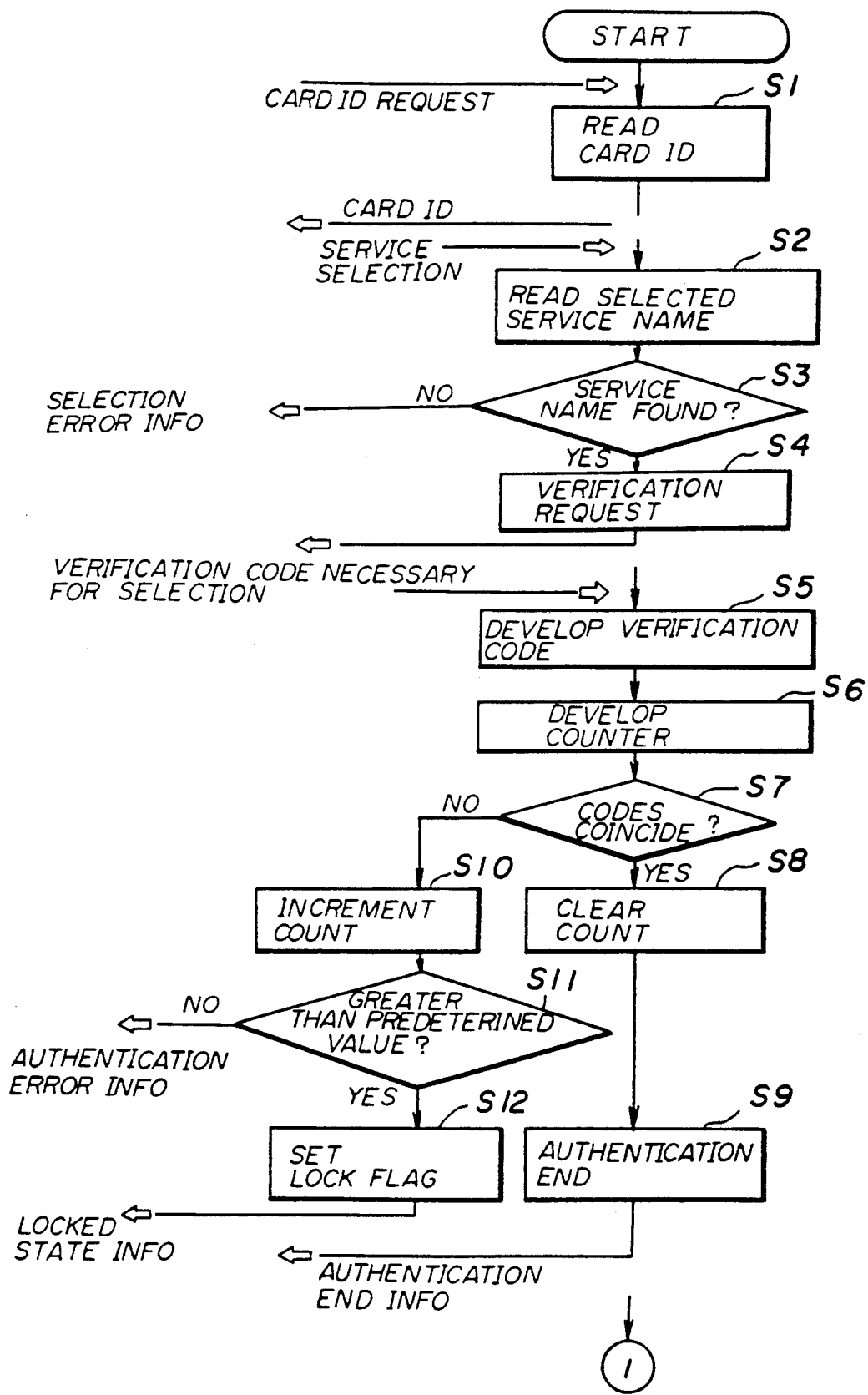

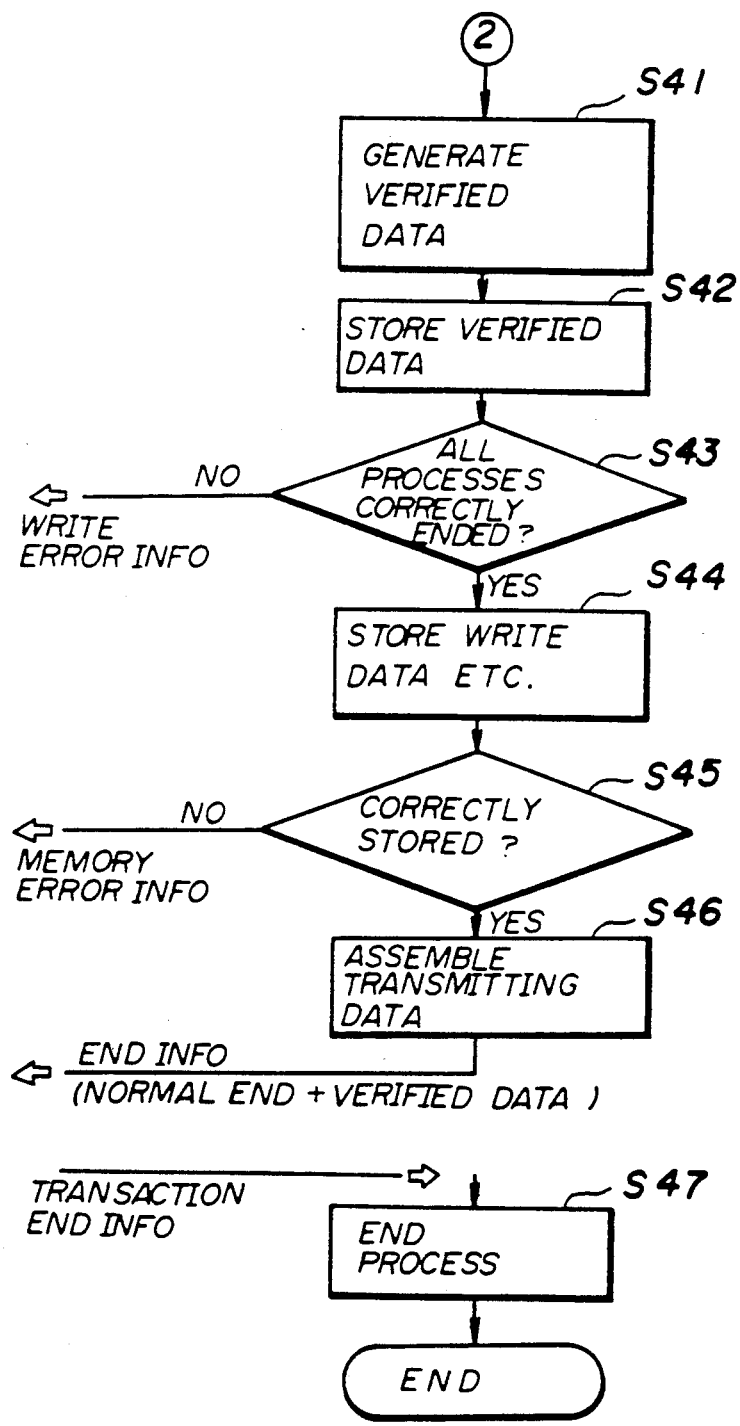

TRANSACTION AUTHENTICATION SYSTEM

BACKGROUND OF THE INVENTION

The present invention generally relates to transaction authentication systems, and more particularly to a transaction authentication system which authenticates a transaction which uses an integrated circuit (IC) card after the transaction is made.

Presently, transactions using cards are popular due to their convenience. But on the other hand, illegal use of such cards is increasing and it is becoming more and more important to authenticate the transactions.

Conventionally, when authenticating a transaction which uses a magnetic stripe card, verified data is generated within a terminal device in conformance with a predetermined algorithm and is added to transaction data. The uniqueness of the data is used when discriminating whether or not the transaction is correctly performed.

For example, the magnetic stripe card is loaded on a point-of-sales (POS) terminal or the like when using a credit service. Prior to making a transaction, a check is made to prevent illegal use of the magnetic stripe card. For example, a personal identification number (PIN) is entered by the user and the POS terminal discriminates whether or not the entered PIN corresponds with a PIN which is prerecorded on the magnetic stripe card. The POS terminal discriminates whether or not the use of the magnetic stripe card on the POS terminal is permitted based on a terminal confirmation code. After it is discriminated that the PIN entered by the user corresponds with the PIN prerecorded on the magnetic stripe card and that the use of the magnetic stripe card is permitted on the POS terminal, the POS terminal adds verified data to the transaction data and temporarily stores the data on a recording medium. The verified data is generated within the POS terminal in conformance with a predetermined algorithm. For example, the recording medium is a flexible disc. After the transaction ends, transaction historical information is transferred to a host computer within an operation center or the like by a batch data transmission.

The character of the verified data differs from that of the PIN in that the user is unaware of the existence of the verified data and the verified data is not used for prohibiting the transaction. Normally, a check is made after the transaction is made to determine whether or not the value of the verified data is in conformance with the generating algorithm so as to discriminate whether or not the transaction made was legitimate.

However, a person who is familiar with the operations and functions of the POS terminal may easily decode a program for generating the verified data. Furthermore, a person who somehow finds out the generating algorithm for generating the verified data may easily and freely operate the POS terminal without using a magnetic stripe card. Such persons can make an illegal transaction by fabricating or altering the transaction data and the verified data. When making the illegal transaction, such persons can easily make the verified data, which is added to the illegal transaction data, take a value in conformance with the generating algorithm, and in this case, it is impossible to find out that an illegal transaction was made. An integrated circuit (IC) card also suffers a similar problem because the verified data is generated and added to the transaction data within the terminal.

SUMMARY OF THE INVENTION

Accordingly, it is a general object of the present invention to provide a novel and useful transaction authentication system in which the problems described above are eliminated.

Another and more specific object of the present invention is to provide a transaction authentication system comprising terminal means comprising first processing means and a card reader/writer, first memory means, and an integrated circuit card which is detachably loaded into the card reader/writer and comprises second processing means and second memory means. The terminal means supplies at least a transaction data which is related to a transaction and a designated storage region in the second memory means for storing the transaction data to the integrated circuit card when the integrated circuit card makes an access to a service via the terminal means. The second processing means of the integrated circuit card writes the transaction data received from the terminal means in the designated storage region of the second memory means and generates a verified data which is renewed every time the transaction data is written into the second memory. The verified data has a value in conformance with a predetermined generating algorithm and is stored in the second memory means and is also supplied to the terminal means. The first processing means of the terminal means generates a transaction historical information which includes at least the designated storage region, the transaction data and the verified data and stores the transaction historical information in the first memory means. Thus, a transaction is authenticated from a correspondence of the verified data stored in the first memory means and the verified data stored in the second memory means. According to the transaction authentication system of the present invention, the verified data which is unique for each transaction is stored within the integrated circuit card and is also supplied to the terminal means to be stored in the first memory means. Hence, it is possible to authenticate the transaction by verifying the verified data stored within the integrated circuit card and the first memory means. The verified data cannot be fabricated or altered even by a person who is familiar with the programs of the terminal means, and the reliability of the integrated circuit card is greatly improved compared to the conventional case because illegal transactions can easily be found.

Other objects and further features of the present invention will be apparent from the following detailed description when read in conjunction with the accompanying drawings.

BRIEF DESCRIPTION OF THE DRAWINGS

FIGS. 6A, 6B and 6C, respectively, are flow charts for explaining an operation of a central processing unit of the IC card shown in FIG. 5.

DESCRIPTION OF THE PREFERRED EMBODIMENTS

Figure 1:
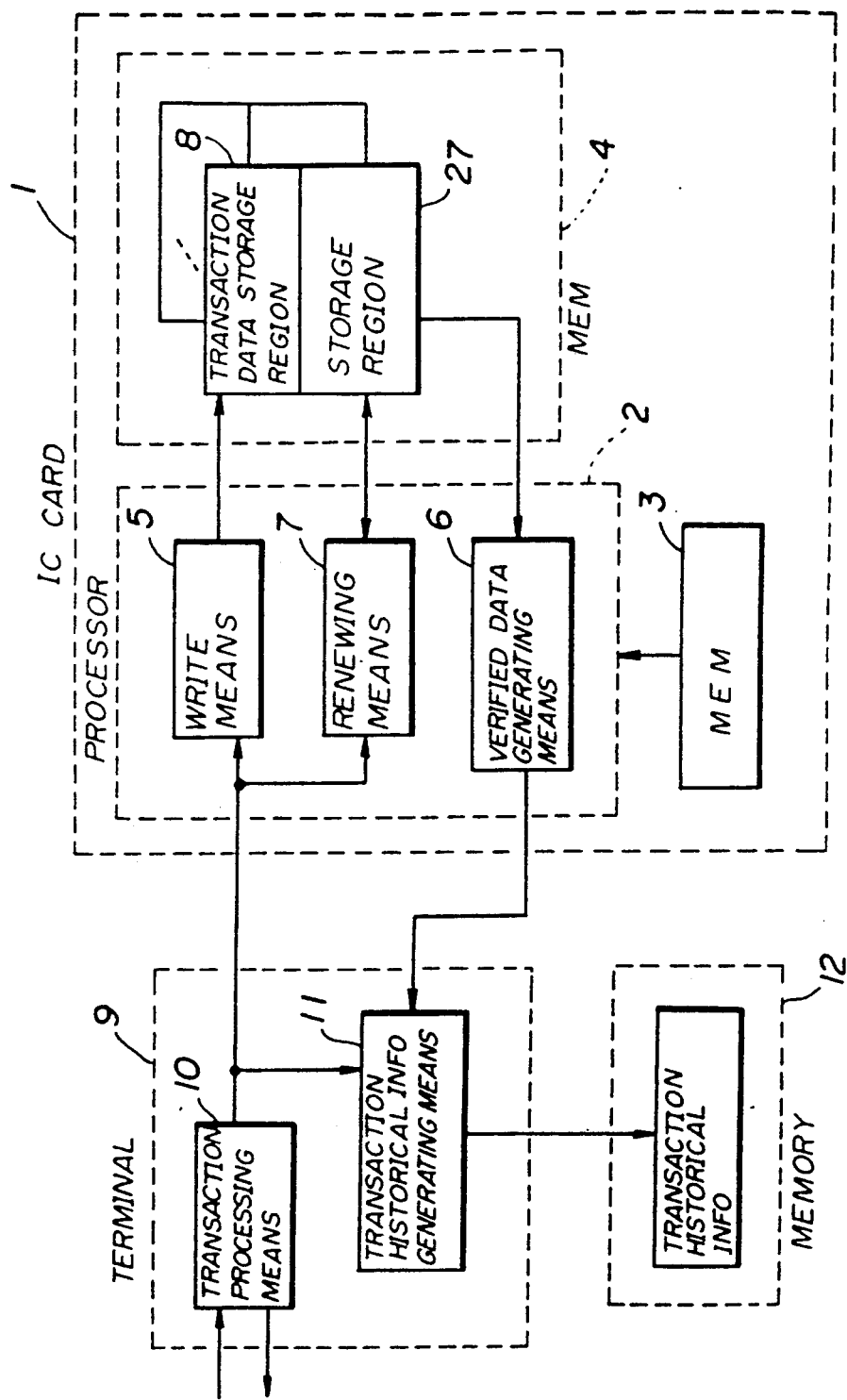
FIG. 1 is a system block diagram for explaining an operating principle of a transaction authentication system according to the present invention.

First, a description will be given of an operating principle of a transaction authentication system according to the present invention by referring to FIG. 1. The transaction authentication system generally comprises an IC card 1, a terminal 9, and a memory device 12. The IC card 1 comprises a processor 2, a first memory 3 which prestores a plurality of processing means (or programs) for operating the processor 2, and a second memory 4 which stores a transaction data which is processed by the operation of the processor 2. When making a transaction using the IC card 1, the transaction authentication system starts the transaction after authenticating a specific information which is stored in the IC card 1. The second memory 4 includes transaction data storage regions 8 (only one is shown) which are respectively designated for each transaction and storage regions 27 (only one is shown) which respectively store transaction execution identifying information for each transaction in correspondence with a transaction data storage region 8. The processor 2 includes a write means 5 for designating the transaction data storage region 8 and for storing a transaction data therein, a verified data generating means 6 for generating a verified data for a transaction based on the transaction execution identifying information, and a renewing means 7 for renewing the transaction execution identifying information within the storage region 27 every time the transaction data is received.

The IC card 1 is loaded into the terminal 9 which can read and write information with respect to the IC card 1. The terminal 9 comprises a transaction processing means 10 for executing a transaction after the specific information of the IC card 1 is confirmed, and a transaction historical information generating means 11 for generating a transaction historical information in which a transaction data is added with a verified data which is read from the IC card 1 and an information which designates the transaction data storage region 8 for each transaction. The memory device 12 stores the transaction historical information which is received from the terminal 9.

The transaction is made as follows. When the IC card 1 is loaded into the terminal 9, the terminal 9 reads card identification information (for example, a card name) from the IC card 1 via a route which is not shown in FIG. 1 and starts the transaction if the PIN can be confirmed. A transaction data which is obtained by the start of the transaction is output from the transaction processing means 10. The transaction data and an address data which designates a write address within the IC card 1 are supplied to the transaction historical information generating means 11 within the terminal 9 and the write means 7 and the renewing means 5 within the IC card 1.

The write means 5 writes the received transaction data at a designated address of the transaction data storage region 8 of the second memory 4. The renewing means 7 reads the transaction execution identifying information from an address of the storage region 27 set depending on the designated address, and renews the value of the transaction execution identifying information for every transaction. The renewed transaction execution identifying information is written into the storage region 27 and the renewing means 7 supplies to the verified data generating means 6 information which designates the region into which the renewed transaction execution identifying information is written.

The verified data generating means 6 uses the information which is received from the renewing means 7 to read out the renewed transaction execution identifying information from the storage region 27 and to generate the verified data. This verified data is supplied to the transaction historical information generating means 11 within the terminal 9.

The transaction historical information generating means 11 receives the verified data, the transaction data from the transaction processing means 10 and the information for designating the region within the IC card 1. The transaction historical information generating means 11 generates a transaction historical information which includes at least these three kinds of data and supplies the transaction historical information to the memory device 12.

Accordingly, when the transaction historical information is generated within the terminal 9 without the use of the IC card 1, the value of the verified data of the IC card 1 is no longer in conformance with the generating algorithm. Even when the transaction is made, the value of the verified data included in the transaction historical information which is stored in the memory device 12 after the transaction is different from the value of the verified data which is generated from the transaction execution identifying information which is renewed for every transaction and is stored in the second memory 4 of the IC card 1.

Figure 2:
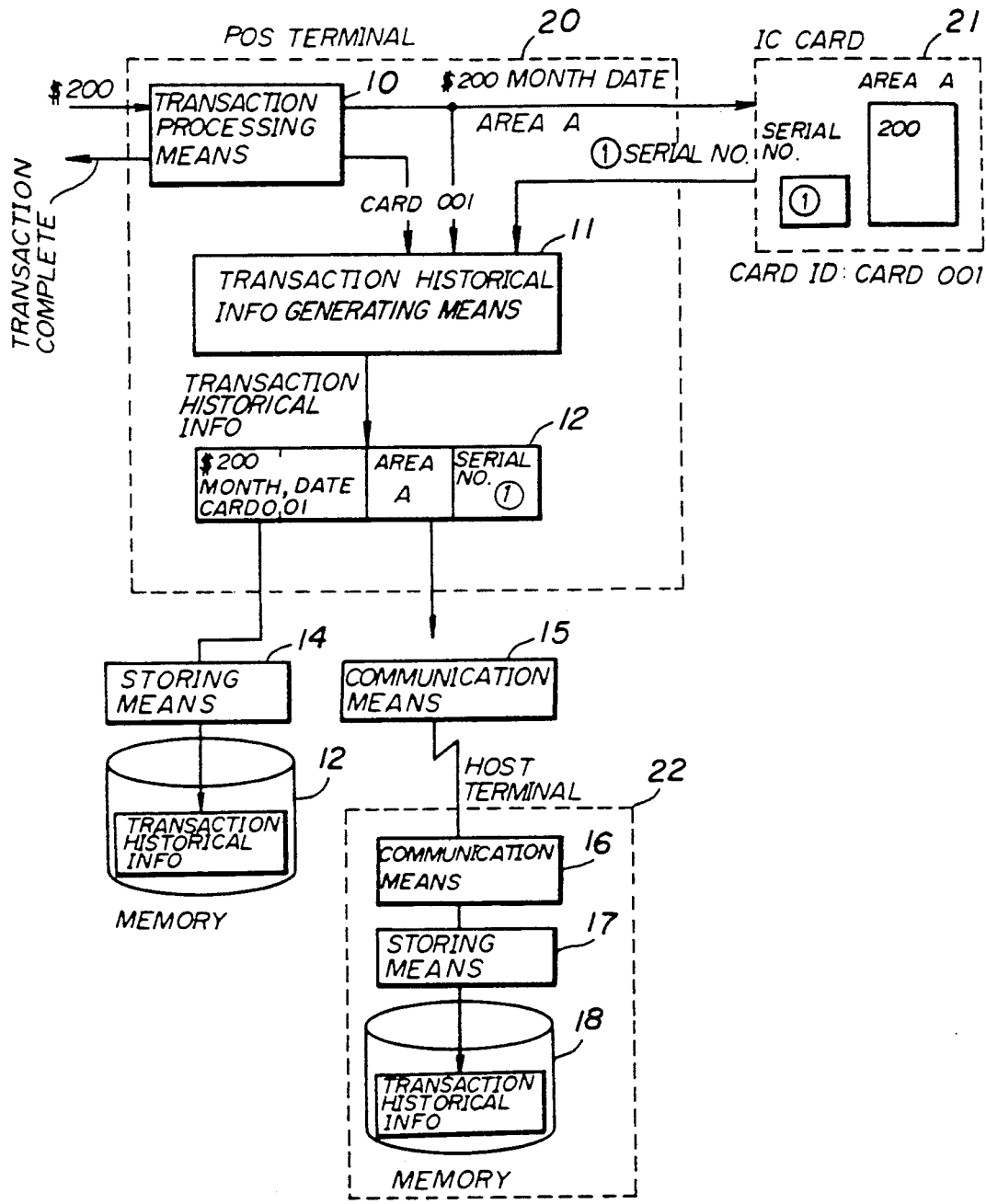
FIG. 2 is a system block diagram of a first embodiment of the transaction authentication system according to the present invention.

Next, a description will be given of a first embodiment of the transaction authentication system according to the present invention, by referring to FIG. 2. In FIG. 2, those parts which are basically the same as those corresponding parts in FIG. 1 are designated by the same reference numerals, and a description thereof will be omitted. In FIG. 2, a POS terminal 20 corresponds to the terminal 9 shown in FIG. 1, and an IC card 21 corresponds to the IC card 1 shown in FIG. 1.

Figure 3:
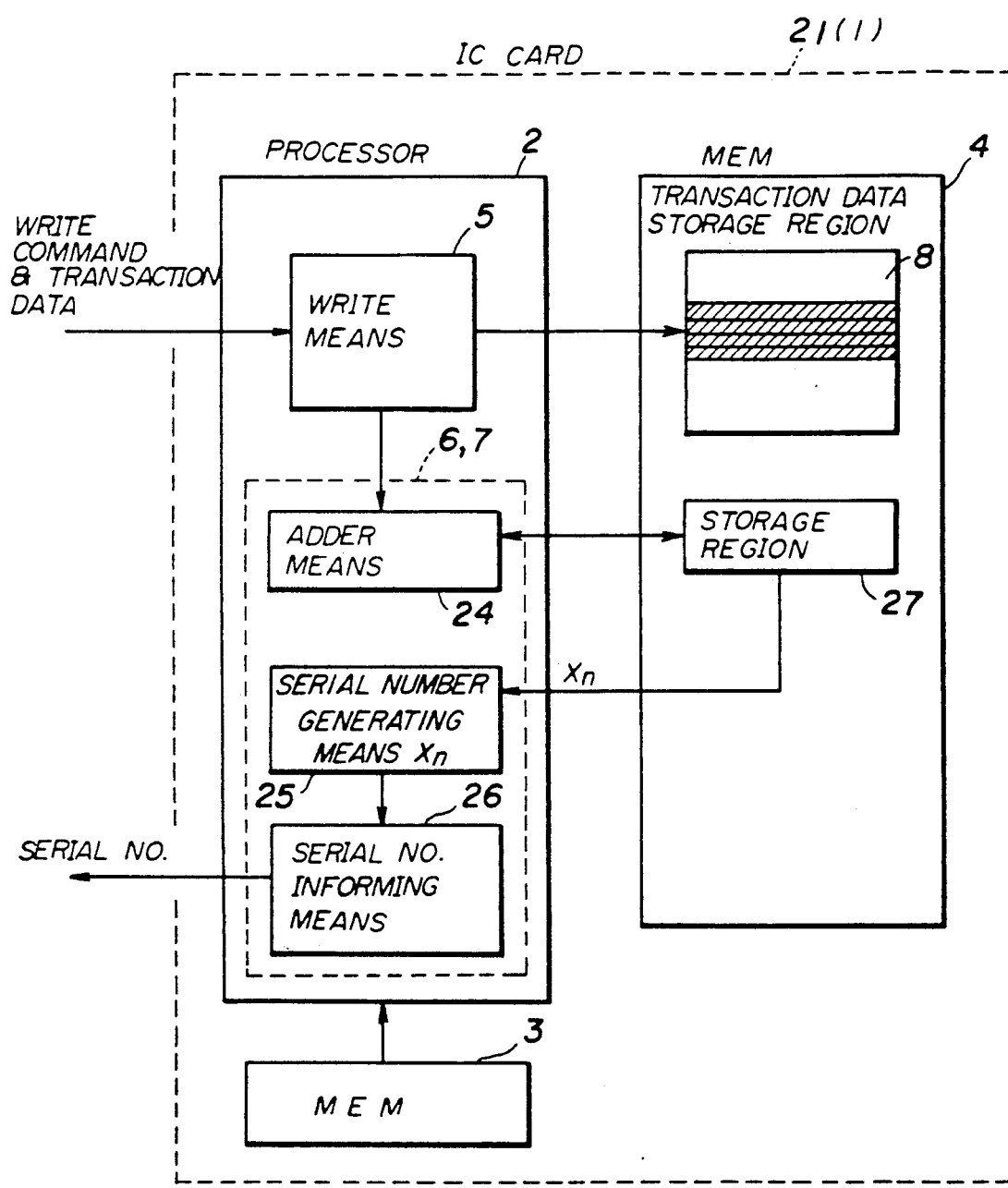
FIG. 3 is a system block diagram of an embodiment of an IC card used in the first embodiment.

FIG. 3 is an embodiment of the IC card 21. In FIG. 3, those parts which are basically the same as those corresponding parts in FIG. 1 are designated by the same reference numerals, and a description thereof will be omitted. The processor 2 of the IC card 21 comprises the first memory 3, the second memory 4, the write means 5, an adder means 24, a serial number generating means 25 and a serial number informing means 26. The adder means 24, the serial number generating means 25 and the serial number informing means 26 correspond to the verified data generating means 6 and the renewing means 7.

When the IC card 21 receives a write command from the POS terminal 20 and the transaction data which is included within the parameter of the write command as the write data, the write means 5 of the processor 2 stores the transaction data in the transaction data storage region 8 of the second memory 4. On the other hand, when storing the transaction data, the adder means 24 adds a constant value to an initial value and the added value (serial number) is stored in the storage region 27 of the second memory as the transaction execution identifying information. The added value is thereafter supplied to the serial number generating means 25.

The serial number generating means 25 generates a serial number as the verified data. In this case, the serial number generating means 25 outputs the transaction execution identifying information (the added value which is a serial number) as it is. The transaction execution identifying information (the serial number) becomes "0" when forming the transaction data storage region 8 and is thereafter incremented by one, for example, every time the transaction data is written. Hence, the transaction execution identifying information is for example a serial number $x_1, x_2, \ldots$.

The serial number is returned to the POS terminal 20 via the serial number informing means 26.

Figure 4A:
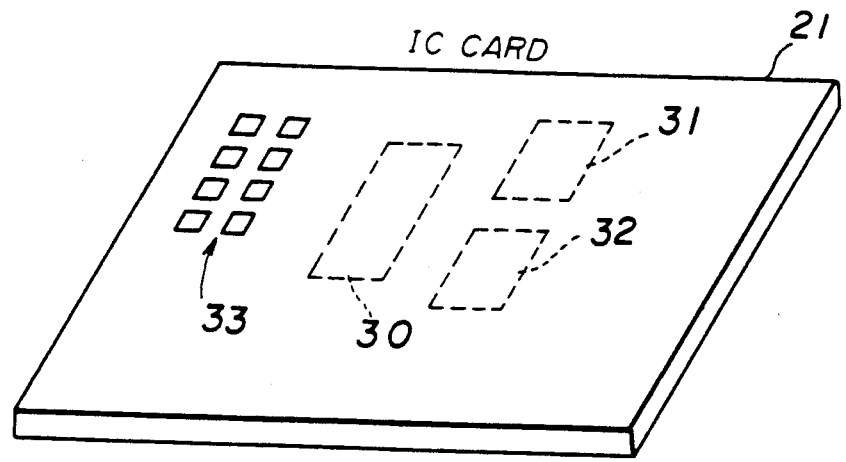
FIGS. 4A and 4B, respectively, are a perspective view and a system block diagram for explaining the embodiment of the IC card shown in FIG. 3 in more detail.
Figure 4B:
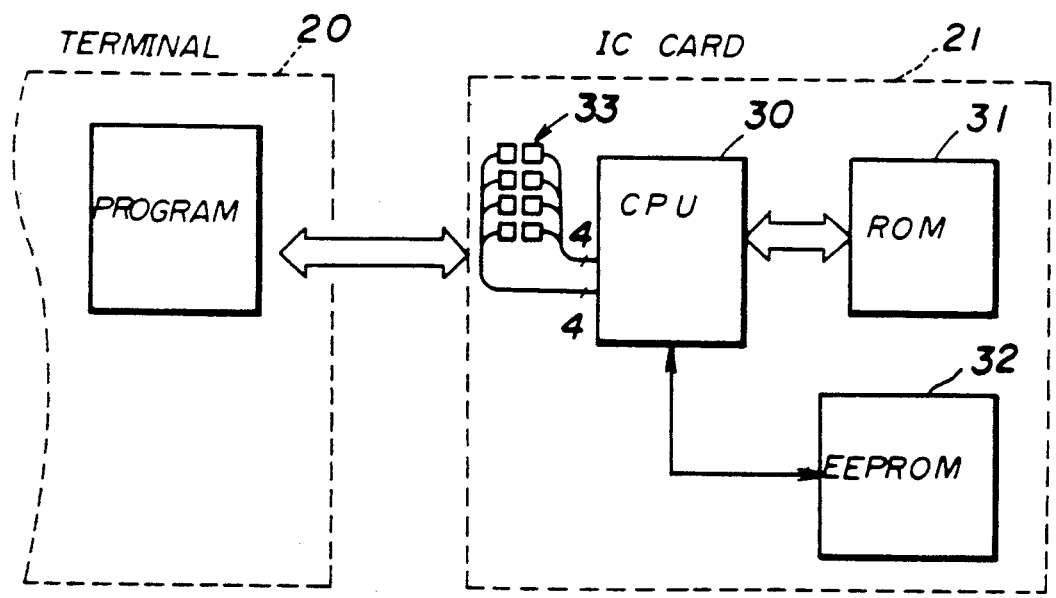

The hardware structure of the IC card 21 itself is known. FIGS. 4A and 4B respectively are a perspective view and a system block diagram for explaining the IC card 21 shown in FIG. 3 in more detail. The IC card 21 shown in FIGS. 4A and 4B comprises a central processing unit (CPU) 30 which corresponds to the processor 2, a read only memory (ROM) 31 which corresponds to the first memory 3, an electrically erasable programmable ROM (EEPROM) 32 which corresponds to the second memory 4, and contacts 33 for signal input/output.

The CPU 30, the ROM 31 and the EEPROM 32 which are made up of semiconductor elements have extremely small sizes and are capable of making complex signal processings and providing large memory capacities. For this reason, unlike the magnetic stripe card which is limited to a single function, the IC card 21 can be used to receive a plurality of services with the same card. For example, the services may include a credit service, deposits and savings services, a hospital service, various private club services and the like. In addition, even when the IC card 21 is used to receive only the credit service, for example, the same card may be used for transactions with a plurality of stores and offices, accounts provided independently for each of the stores and offices, accounts in a plurality of banks and the like.

The IC card 21 is loaded into a card reader/writer (not shown) which is connected to the POS terminal 20. The card reader/writer reads from the IC card 21 the card identification information which identifies the IC card 21, and supplies the card identification information to a host computer (not shown). The host computer returns to the POS terminal 20 a region designating information and the like for designating a transaction data storage region 8 within the IC card 21.

Prior to making the transaction using the IC card 21, a check is made to prevent illegal use of the IC card 21. For example, a personal identification number (PIN) is entered by the user and the POS terminal 20 discriminates whether or not the entered PIN corresponds with a PIN which is prerecorded on the IC card 21. The POS terminal 20 discriminates whether or not the use of the IC card 21 on the POS terminal 20 is permitted based on a terminal confirmation code.

Next, a description will be given of an operation of the first embodiment by referring to FIG. 2. When the user uses the IC card 21 and purchases an item having a price of 200 dollars, for example, the operator of the POS terminal 20 loads the IC card 21 into the card reader/writer of the POS terminal 20 and enters the transaction sum of 200 dollars into the POS terminal 20. In this case, the transaction processing means 10 of the POS terminal 20 outputs a transaction 20 sum data of 200 dollars and a transaction date data which includes the year, month and date of the transaction. The transaction processing means 10 further designates the storage region (area) where the transaction sum data and the transaction date data are to be stored. Based on the data received from the transaction processing means 10, the write means 5 of the IC card 21 writes the transaction data (transaction sum data and transaction date data) in a designated area A of the second memory 4. Then, the serial number generating means 25 of the IC card 21 generates the serial number. This serial number is stored in an internal memory and is supplied to the POS terminal 20.

The transaction historical information generating means 11 of the POS terminal 20 adds the serial number which is received from the IC card 21 to the transaction data (transaction sum data and transaction date data), the card identification information (for example, a card ID "CARD001") of the IC card 21, and the region designating information (area A in this case), so as to generate a unique transaction historical information among the plurality of IC cards, a plurality of POS terminals and a plurality of transaction data. The transaction historical information is written into the memory device 12 via a storing means 14. After the transaction ends, the transaction historical information is written into a memory device 18 within a host terminal 22 via communication means 15 and 16 and a storing means 17 by a batch data transmission.

The transaction is completed in the above described manner. When the transaction is legitimate, the serial numbers within the transaction historical information stored in the memory devices 12 and 18 change regularly in conformance with the generating algorithm. Hence, it is possible to authenticate the transaction by checking the change in the values of the serial numbers. When the transaction is legitimate, the serial number stored in the IC card 21 constantly corresponds with the serial number of the last transaction stored in the memory devices 12 and 18.

For example, the transaction historical information received from the POS terminal 20 may have been generated by an illegal user who not only knows the PIN but also knows the generating algorithm for the serial number. Such an illegal user can operate the POS terminal 20 and generate the transaction historical information without actually using the IC card 21. In this case, it is impossible to prohibit the illegal transaction itself, however, the serial numbers stored in the memory devices 12 and 18 after the transaction is made become different from the serial number stored in the IC card 21. Therefore, it is possible to find out that the illegal transaction has been made by verifying the serial number stored in the IC card 21 and the serial numbers stored in the memory devices 12 and 18, since the stored serial numbers do not correspond in the case of the illegal transaction.

In the first embodiment, the serial number is used as the verified data. However, it is possible to use a function as the verified data. In this case, the transaction execution identifying information x is taken as an argument and the verified data generating means 6 generates a function F(x). For example, the transaction execution identifying information x has an initial value $x_0$ and is renewed for every transaction such that the transaction execution identifying information x has a value $x_k$ when a kth transaction is made.

The function generated by the verified data generating means 6 need not necessarily be a single argument function and may be a multiple argument function. In the case of the multiple argument function, n arguments ($x_1, x_2, x_3, \ldots, x_n$) are renewed for every transaction.

The transaction execution identifying information for example has the initial value $x_0$ and values $x_1, x_2, x_3, \ldots, x_k$ which are calculated for every transaction. All of these values of the transaction execution identifying information may be stored in the storage region 27 of the second memory 4. As an alternative, it is also possible to store only the final value $x_k$ of the transaction execution identifying information in the storage region 27 of the second memory 4.

Figure 5:
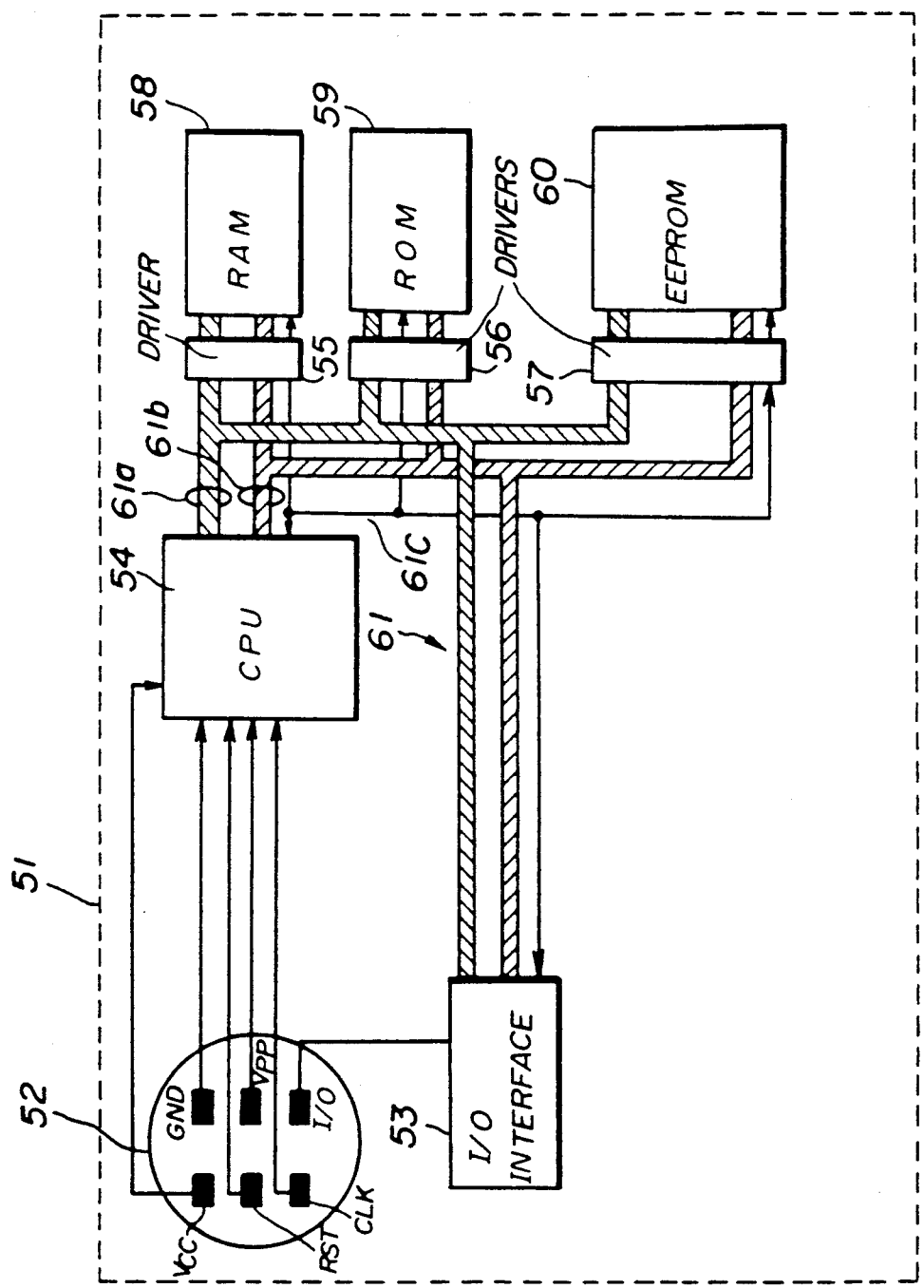
FIG. 5 is a system block diagram of an embodiment of an IC card used in a second embodiment of the transaction authentication system according to the present invention.

Next, a description will be given of a second embodiment of the transaction authentication system according to the present invention. FIG. 5 shows an embodiment of the IC card used in the second embodiment of the transaction authentication system according to the present invention. In FIG. 5, an IC card 51 comprises a terminal group 52, an input/output interface 53, a CPU 54, drivers 55, 56 and 57, a random access memory (RAM) 58, a ROM 59, an EEPROM 60, and a system bus 61.

The terminal group 52 comprises a power source terminal Vcc for receiving a power source voltage, a ground terminal GND for receiving a ground voltage, a reset terminal RST for receiving a reset signal, a programming terminal Vpp for receiving a programming voltage, a clock terminal CLK for receiving a clock signal, and an input/output terminal I/O for inputting and outputting serial data. The terminals of the terminal group 52 other than the input/output terminal I/O are connected to the CPU 54. The input/output terminal is connected to the input/output interface 53.

The input/output interface 53 converts a serial input data into a parallel input data. When a predetermined number of bits of data (for example, four to eight bits of data) is received, the input/output interface 53 interrupts the CPU 54 by sending an interrupt signal. On the other hand, when sending data from the IC card 51 to a terminal (not shown), the data is output serially from the input/output interface 53 via the input/output terminal I/O of the terminal group 52. When outputting the data from the IC card 51, the CPU 54 sets parallel data (for example, eight bits) in the input/output interface 53 and the set data is automatically output via the input/output terminal I/O with a timing determined by the clock signal received from the clock terminal CLK.

The drivers 55, 56 and 57 respectively drive the RAM 58, the ROM 59 and the EEPROM 60. The input/output interface 53, the CPU 54, the drivers 55 through 57, the RAM 58, the ROM 59 and the EEPROM 60 are coupled by the system bus 61. The system bus 61 is made up of an address bus 61a, a data bus 61b, and an input/output control bus 61c. For example, the address bus 61a and the data bus 61b respectively are 8-bit buses. The input/output control bus 61c is used for transmitting the clock signal, the ground voltage, the power source voltage, the interrupt signal and the like.

The RAM 58 is used as a work area for the CPU 54 when making calculations and the like during the transaction. The ROM 59 stores programs from the CPU 54 and corresponds to the ROM 31 shown in FIGS. 4A and 4B. The EEPROM 60 stores the account number, PIN, balance of the account, transaction history, final transaction information, transaction historical information and the like and corresponds to the EEPROM 32 shown in FIGS. 4A and 4B.

The IC card 51 is used on a terminal such as the POS terminal 20 described before in conjunction with the first embodiment.

Figure 6B:
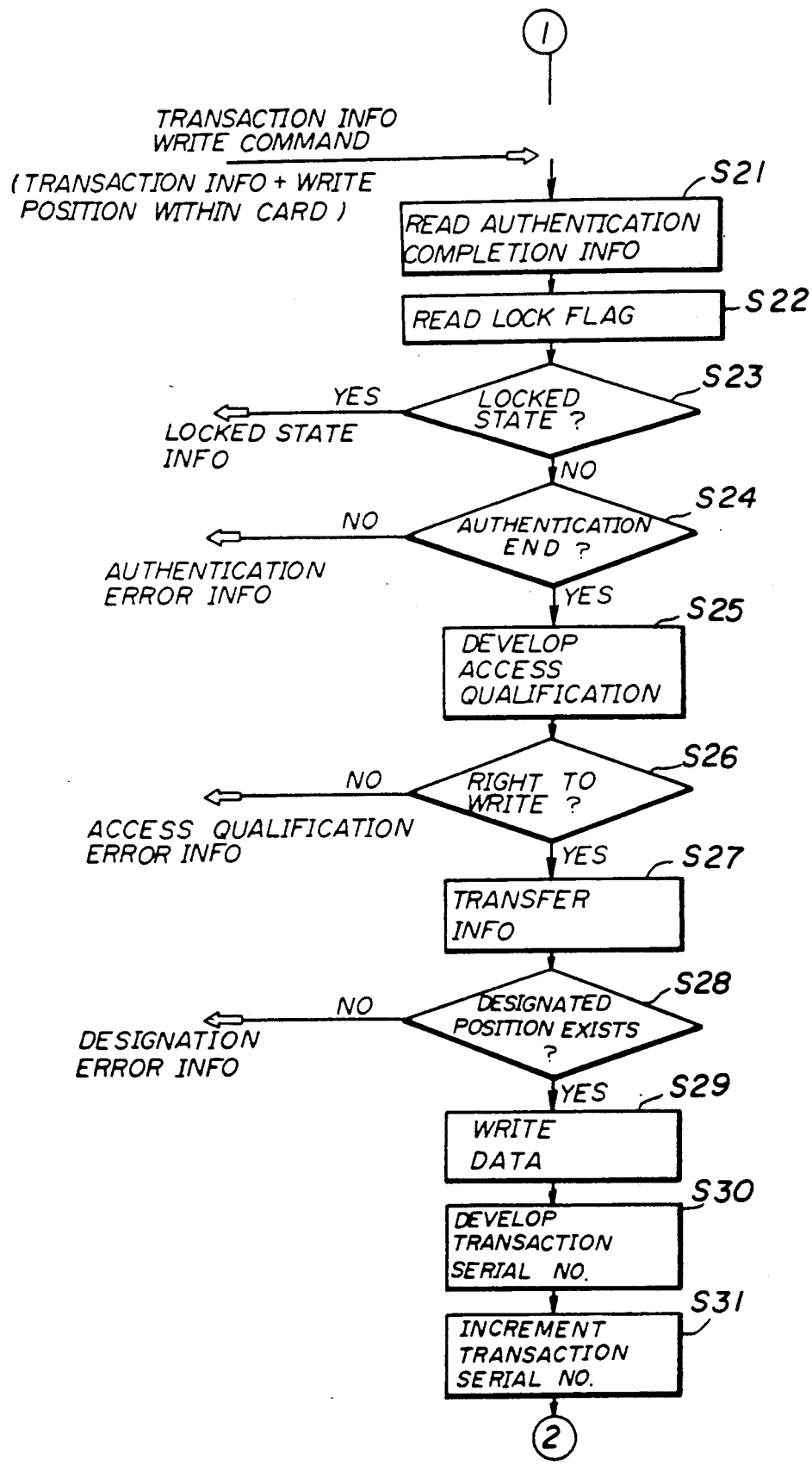

FIGS. 6A, 6B and 6C respectively are flow charts for explaining an operation of the CPU 54 of the IC card 51 shown in FIG. 5. In FIG. 6A, when an internal process of the IC card 51 is started and a card ID request is received, a step S1 reads the card ID from the EEPROM 60. The read card ID is supplied to the terminal and a desired service is selected from the terminal. A step S2 reads a service name of the selected service from the ROM 59. A step S3 discriminates whether or not the service name is found in the ROM 59. When the discrimination result in the step S3 is NO, a selection error information is supplied to the terminal. But when the discrimination result in the step S3 is YES, a step S4 requests authentication to the terminal. The terminal then supplies an authenticate code or key (PIN) which is necessary to make the selection, and a step S5 develops the authenticate code which corresponds to the selected service from the EEPROM 60 to the RAM 58. A step S6 develops an error number counter in the RAM 58.

A step S7 discriminates whether or not the authenticate code which is received from the terminal corresponds the authenticate code which is developed in the RAM 58. When the discrimination result in the step S7 is YES, a step S8 clears the error number counter and stores the authenticate code in the EEPROM 60. A step S9 stores in the EEPROM 60 an information which indicates that the authentication is ended, and the authentication end information is supplied to the terminal and the process advances to a step S21 shown in FIG. 6B.

On the other hand, when the discrimination result in the step S7 is NO, a step S10 increments the counted value in the error number counter and stores the incremented value in the EEPROM 60. A step S11 discriminates whether or not the counted value in the error number counter is greater than a predetermined number. When the discrimination result in the step S11 is NO, a legitimacy error information is supplied to the terminal. But when the discrimination result in the step S11 is YES, a step S12 sets a lock flag within the EEPROM 60 to an ON state and a locked state information is supplied to the terminal. When the lock flag is ON, the IC card 51 is made unusable for the selected service, and a locked state information is supplied to the terminal. In other words, the lock flag indicates whether or not the selected service is accessible by the IC card 51.

As described before, the IC card 51 may be used to receive various services. Hence, it is inconvenient if the IC card 51 were made unusable for all the services even when only predetermined number of one or more services should actually be made non-accessible. Therefore, in actual practice, the error number counter is provided for each service and the predetermined number used for the comparison in the step S11 is set for each service. In other words, a lock flag is provided for each service accessible by the IC card 51. For the sake of convenience, a description will hereunder be given of a case where only one lock flag is provided.

In FIG. 6B, a transaction information write command including a transaction information and a write position within the IC card 51 is received from the terminal. A step S21 reads an authentication completion information, and a step S22 reads the lock flag. A step S23 discriminates whether or not the lock flag is ON. When the discrimination result in the step S23 is YES, a locked state information is supplied to the terminal. On the other hand, when the discrimination result in the step S23 is NO, a step S24 discriminates whether or not the authentication is ended. When the discrimination result in the step S24 is NO, an authentication error information is supplied to the terminal. When the discrimination result in the step S24 is YES, a step S25 develops the access qualification information of the user in accordance with the authentication information from the EEPROM 60 to the RAM 58.

A step S26 discriminates whether or not the user has a right to write information. When the discrimination result in the step S26 is NO, an access qualification error information is supplied to the terminal. But when the discrimination result in the step S26 is YES, a step S27 transfers the necessary information from the EEPROM 60 to the RAM 58 and a step S28 discriminates whether or not a designated write position exists. When the discrimination result in the step S28 is NO, a designation error information is supplied to the terminal. On the other hand, when the discrimination result in the step S28 is YES, a step S29 writes the data at the designated write position within the RAM 58. A step S30 develops the transaction serial number from the EEPROM 60 to the RAM 58, and a step S31 increments the transaction serial number in the RAM 58. The process then advances to a step S41 shown in FIG. 6C.

In FIG. 6C, the step S41 performs a calculation to generate the verified data in conformance with a generating algorithm based on unique numbers such as the transaction serial number and the transaction date. A step S42 stores the verified data in the RAM 58. A step S43 discriminates whether or not all of the processes are correctly ended. When the discrimination result in the step S43 is NO, a write error information is supplied to the terminal. On the other hand, when the discrimination result in the step S43 is YES, a step S44 stores the write information, the verified data and the transaction serial number in the EEPROM 60. A step S45 discriminates whether or not the data are correctly stored in the EEPROM 60 in the step S44. When the discrimination result in the step S45 is NO, a memory error information is supplied to the terminal. When the discrimination result in the step S45 is YES, a step S46 assembles the transmitting data and an end information including a normal end information and the verified data is supplied to the terminal. When a transaction end information is received from the terminal, a step S47 ends the process by releasing the RAM 58 and the process is ended.

Figure 7:
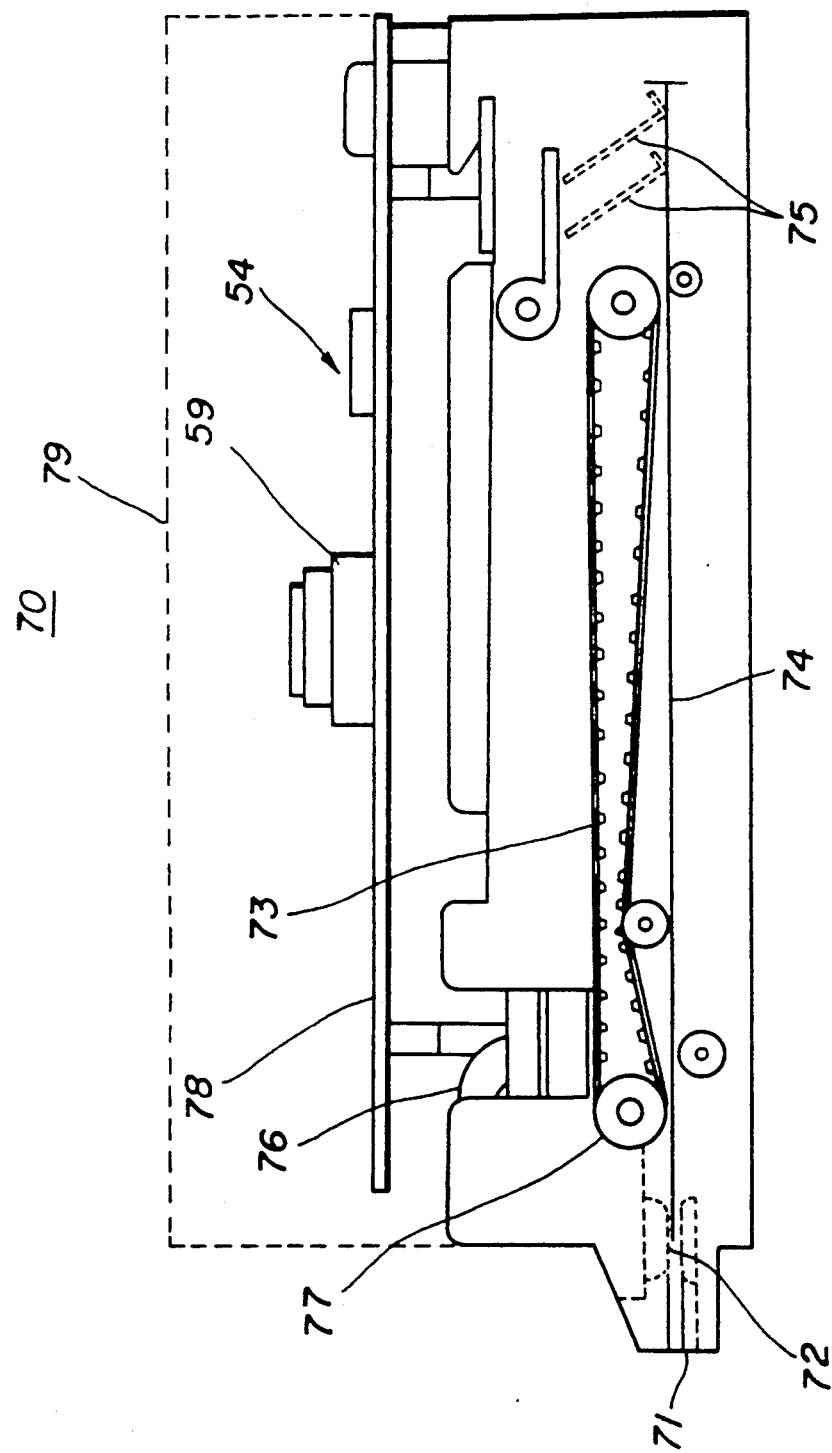
FIG. 7 is a cross section side view of an embodiment of a card reader/writer which is used in the second embodiment.

FIG. 7 generally shows an embodiment of a card reader/writer which is used in the second embodiment. Of course a similar card reader/writer may be used in the first embodiment. In FIG. 7, a card reader/writer 70 generally comprises a card inserting opening 71, a magnetic head 72, a timing belt 73, a card transport path 74, a contact part 75, a motor 76, a roller 77, a printed circuit 78 which has the CPU 54, the ROM 59 and the like arranged thereon, and a cover 79 which is indicated by a phantom line.

When the IC card 51 is inserted into the card inserting opening 71, the IC card 51 is transported along the card transport path 74 by a transport mechanism to a loaded position where contacts of the contact part 75 make contact with the corresponding terminals of the terminal group 52 of the IC card 51. The transport mechanism includes the motor 76 which rotates the roller 77 so as to drive the timing belt 73.

In this embodiment, the magnetic head 72 is provided to read a magnetic stripe of the IC card 51. The provision of the magnetic head 72 enables the card reader/writer 70 to read the magnetic stripes of both the IC card 51 and the conventional magnetic stripe card. In other words, there is card interchangeability among the IC cards and the magnetic stripe cards. However, it is not essential to provide the magnetic head 72 on the card reader/writer 70. In addition, the card reader/writer 70 may be a part of the terminal or be a unit independent of the terminal.

Further, the present invention is not limited to these embodiments, but various variations and modifications may be made without departing from the scope of the present invention.

What is claimed is:

1. A transaction authentication system comprising:
    terminal means including:
        first processing means; and
        a card reader/writer;
    a first memory means; and
    an integrated circuit card which is detachably loaded into said card reader/writer, said integrated circuit card including:
        second processing means: and
        second memory means,
    said terminal means supplying at least a transaction data which is related to a transaction and a designated storage region in said second memory means for storing the transaction data to said integrated circuit card when said integrated circuit card makes an access to a service via said terminal means,
    said second processing means of said integrated circuit card writing the transaction data received from said terminal means in the designated storage region of said second memory means and generating a verified data which is renewed every time the transaction data is written into said second memory, said verified data having a value in conformance with a predetermined generating algorithm using the verified data stored previously in said second memory, said verified data being stored in said second memory means and also supplied to said terminal means,
    said first processing means of said terminal means generating transaction historical information which includes at least the designated storage region, the transaction data and the verified data, and storing the transaction historical information in said first memory means, thereby a transaction being authenticated from a correspondence of the verified data stored in said first memory means and the verified data stored in said second memory means.

2. A transaction authentication system as claimed in claim 1, wherein said first memory means is connected to said terminal and is provided exclusively for said terminal means.

3. A transaction authentication system as claimed in claim 1, wherein said first memory means is coupled to said terminal means via communication means.

4. A transaction authentication system as claimed in claim 1, wherein said terminal means comprises a point-of-sales terminal.

5. A transaction authentication system as claimed in claim 1, wherein said integrated circuit card further comprises a terminal group which is coupled to said second processing means, said card reader/writer of said terminal means reading/writing serial data with respect to said integrated circuit card via said terminal group.

6. A transaction authentication system as claimed in claim 1, wherein said second processing means of said integrated circuit card generates a serial number as the verified data.

7. A transaction authentication system as claimed in claim 1, wherein said second processing means of said integrated circuit card generates an n-argument function as the verified data, where $n = 1, 2, \ldots$.

8. A transaction authentication system as claimed in claim 1, wherein said second processing means of said integrated circuit card generates, as the verified data, a value which is unique for each transaction.

9. A transaction authentication system as claimed in claim 1, wherein said second processing means of said integrated circuit card stores in said second memory means only a verified data which is generated with respect to a last transaction.

10. A transaction authentication system as claimed in claim 1, wherein said second memory means comprises a first memory for storing programs for carrying out processes on said second processing means and a second memory for storing data.

11. A transaction authentication system as claimed in claim 10, wherein said first memory comprises a read only memory and said second memory comprises an electrically erasable programmable read only memory.

12. A transaction authentication system as claimed in claim 10, wherein said second memory means further comprises a third memory for providing a work area for said second processing means.

13. A transaction authentication system as claimed in claim 12, wherein said third memory comprises a random access memory.

14. A transaction authentication system as claimed in claim 1, wherein said second processing means includes means for setting a lock flag when an authenticate code, which is received from said terminal means and corresponds to a selected service, differs from an authenticate code stored in said second memory means a predetermined number of times, said first lock flay indicating that the selected service is non-accessible.

15. A transaction authentication system as claimed in claim 14, wherein said lock flag is set independently for each service.

16. A transaction authentication system as claimed in claim 1, wherein said second processing means comprises:
write means for writing the transaction data, which is received from said terminal means, into the designated storage region of said second memory means;
renewing means for renewing a transaction execution identifying information which is stored in said second memory means every time the transaction data is received from said terminal means; and
verified data generating means for generating the verified data based on the transaction execution identifying information read from said second memory means.

17. A transaction authentication system as claimed in claim 16, wherein said verified data generating means supplies the transaction execution identifying information, which is read from said second memory means, to said terminal means as the verified data.

18. A transaction authentication system as claimed in claim 1, wherein said second memory means stores card identification information, wherein said second processing means of said integrated circuit card supplies the card identification which is read from said second memory means together with the verified data, and wherein said first processing means of said terminal means generates the transaction historical information which also includes the card identification information.

* * * * *

UNITED STATES PATENT AND TRADEMARK OFFICE
CERTIFICATE OF CORRECTION

PATENT NO. : 5,097,115

DATED : MARCH 17, 1992

INVENTOR(S) : NOBUO OGASAWARA ET AL.

It is certified that error appears in the above-identified patent and that said Letters Patent is hereby corrected as shown below:

TITLE PAGE [56] References Cited

After line 4, (the Walton reference) insert --4,529,870  7/1985  Chaum ..... 235/380--.

TITLE PAGE [57] ABSTRACT

Line 4, "transaction a" should be --transaction.  A--.

DRAWINGS -- SHEET 2 OF 9

This drawing should be labelled --FIG. 2--.

Col. 3, line 8, "section" should be --sectional--;

line 67, "write means 7" should be --write means 5--;

line 67, "renewing means 5" should be --renewing means 7--.

Col. 6, line 6, "transaction 20 sum" should be --transaction sum--.

Col. 8, line 60, "only" should be --only a--.

UNITED STATES PATENT AND TRADEMARK OFFICE
CERTIFICATE OF CORRECTION

PATENT NO. : 5,097,115
DATED : MARCH 17, 1992
INVENTOR(S) : NOBUO OGASAWARA ET AL.

It is certified that error appears in the above-identified patent and that said Letters Patent is hereby corrected as shown below:

Col. 10, line 64, "terminal and" should be --terminal means and--.

Col. 12, line 10, "flay" should be --flag--.

Signed and Sealed this

Third Day of August, 1993

Attest:

MICHAEL K. KIRK

Attesting Officer     Acting Commissioner of Patents and Trademarks